UNITED STATES PATENT OFFICE.

WILLIAM C. KERR, OF CATONSVILLE, MARYLAND.

PROCESS OF OBTAINING HYDROCHLORIC ACID, SODIUM SULFATE, AND MAGNESIUM SULFATE.

1,203,357.  Specification of Letters Patent.  Patented Oct. 31, 1916.

No Drawing.   Application filed April 4, 1914.   Serial No. 829,595.

*To all whom it may concern:*

Be it known that I, WILLIAM C. KERR, a citizen of the United States, residing at Catonsville, in the county of Baltimore and State of Maryland, have invented certain new and useful Improvements in Processes of Obtaining Hydrochloric Acid, Sodium Sulfate, and Magnesium Sulfate, of which the following is a specification.

My present invention pertains to an improved process of obtaining hydrochloric acid, sodium sulfate and magnesium sulfate, the same being produced by the interaction between niter cake ($NaHSO_4$) and magnesium chlorid.

Niter cake, as is well known, is relatively cheap, and in many instances and places is looked upon as a waste product, and it is through the utilization of this material that the present process may be successfully carried out upon a commercial scale. Again, the magnesium chlorid being much more readily decomposed than sodium chlorid, this process requires less expenditure of heat to drive off the hydrochloric acid, the wear on the furnace or oven is much less and the evolved gas being cooler is more readily condensed than in the old "salt cake," process.

Niter cake and crude magnesium chlorid, in the solid form but containing more or less water, are intimately intermixed in approximately the proportion of two molecules of $NaHSO_4$ to one of $MgCl_2$. It is not essential to the process that the impurities usually present in the materials be removed, as the desired results will be obtained notwithstanding their presence. The materials may be separately ground and then intermixed, or ground together, whereby they are intermixed, water to a greater or less extent being added while the intermixing is being done, or thereafter. Again, instead of employing this method of intermixing, a solution of the magnesium chlorid may be made and intimately mixed with the finely-divided niter cake, or, a solution of the niter cake may be made and intimately mixed with the finely-divided magnesium chlorid, or, the niter cake and the magnesium chlorid may be dissolved together, or, the niter cake and the magnesium chlorid may be dissolved separately and the solutions mixed. The mixture or solution, as the case may be, is then rapidly, and in such a manner as to avoid the loss of any considerable amount of the acid gas being evolved, transferred to an oven or furnace of suitable construction and there subjected to a temperature of from 100° C. to 200° C., sufficient to expel most of the hydrochloric acid which is formed. The type of furnace or oven to be employed is immaterial, and the heating may be effected in one in which the operation is intermittent, or in one arranged for continuous operation.

The acid gas as it is evolved is conducted away from the apparatus and treated in any well-known manner, in order to purify and to condense the same.

The hard white residue, consisting of sulfates of sodium and magnesium, and impurities, is removed from the oven or furnace and dissolved in water. The solution thus formed may be purified and treated, by any of the well-known methods of crystallization or precipitation, for separation and recovery of the valuable magnesium and sodium salts. The following method may, for instance, be followed: The hard white residue above referred to consists largely of magnesium sulfate and sodium sulfate but contains also small quantities of sodium chlorid, magnesium chlorid, sodium bisulfate, insoluble materials, and still smaller quantities of arsenic and iron compounds. Of these constituents the magnesium salts and the sodium sulfate are the only ones it is important to recover, but in order to accomplish this recovery and obtain a pure product it is important to first remove the insoluble material and the iron and arsenic compounds. Accordingly, the white residue is dissolved in hot water, the solution is heated to boiling, the iron and arsenic are oxidized by the use of a small quantity of sodium peroxid, bleaching powder, or chlorin, and then sodium carbonate is added in quantity just sufficient to precipitate the iron, whereupon the insoluble matter, together with the precipitated iron and arsenic compounds, settles out and the purified solution is drawn off at the top. The solution having been purified, it remains only to recover the magnesium compounds and the sodium sulfate. This may be done by bringing the concentration of the solution to the proper point and then crystallizing the magnesium sulfate and sodium sulfate out separately by cooling, or the magnesium compounds may be precipitated and recovered as magnesium carbonate by addition of sodium carbonate, and settled out or filtered off and the remaining sodium sulfate recovered by crystallization, or the magnesium compounds may be precipitated and recovered as magnesium hydroxid by addition of sodium hydroxid and settled out or filtered off and the remaining sodium sulfate recovered by crystallization.

Having thus described my invention, what I claim is:

1. The method of producing hydrochloric acid and a mixture of magnesium and sodium sulfates, which consists in intermixing niter cake and magnesium chlorid; and bringing the mixture to such a temperature as to drive off the hydrochloric acid gas and bring about the formation of the sulfates specified.

2. The method of producing hydrochloric acid and magnesium and sodium sulfates, which consists in intermixing niter-cake and magnesium chlorid in substantially the proportions of two molecules to one, respectively, in the presence of water; subjecting the mixture or solution thus formed to a temperature approximating 200° C.; drawing off the evolved hydrochloric acid; and finally separating the sulfates produced as a result of the reaction which takes place.

In testimony whereof I have signed my name to this specification in the presence of two subscribing witnesses.

WILLIAM C. KERR.

Witnesses:
C. E. SENCA,
R. M. COULBOURN, Jr.